United States Patent Office 3,703,556
Patented Nov. 21, 1972

3,703,556
HALOGENATION OF HYDROXYARYL SULFONES
David S. Davis, West Orange, and Young K. Kim, Paterson, N.J., assignors to Witco Chemical Corporation, New York, N.Y.
No Drawing. Filed Nov. 14, 1969, Ser. No. 876,990
Int. Cl. C07c 147/10
U.S. Cl. 260—607 A                 5 Claims

ABSTRACT OF THE DISCLOSURE

Brominated or chlorinated derivatives of hydroxyaryl sulfones are produced by direct halogenation of the sulfone in carboxylic acid solvent medium, said acid having from 1 to 6 carbon atoms.

---

This invention relates to a novel process for producing halogenated hydroxyaryl sulfones by direct introduction of elemental chlorine or bromine into the aromatic nucleus.

Halogenated aromatic sulfones are known in the art and have a number of important uses among which are polymer crosslinking agents, pesticides, anti-bacterial and anti-fungicidal agents and in cosmetic sunscreening preparations as disclosed, for example, in U.S. Patent No. 3,185,628.

Various processes have been disclosed for the preparation of halogenated aryl sulfones, or more particularly halogenated hydroxyaryl sulfones, such as, for example, by chlorinating or brominating by utilizing an alkali metal hypochlorite or hypobromite, or by oxidizing the corresponding halogenated hydroxyaryl sulfide with hydrogen peroxide such as are disclosed in U.S. Patent No. 3,202,575 and in the Journal of the American Chemical Society, 67, 238 (1945); or by reacting a halogenated phenol with a sulfonating agent such as sulfuric acid so as to produce the halogenated hydroxyaryl sulfone. U.S. Patents Nos. 2,999,883; 3,094,455; 3,304,331; 3,344,123; 3,367,974 and 3,415,832 are representative of the aforementioned procedures as well as other processes for preparing halogenated sulfones.

The production of halogenated hydroxyaryl sulfones by direct chlorination or bromination has not been favored in the art because of the possibility of cleavage of the molecule by the elemental halogen, and such has been found to be the case with most of the commonly used solvent media for direct halogenation.

In accordance with this invention it has been found that halogenated hydroxyaryl sulfones can effectively be prepared by a process which comprises reacting a member selected from the group of elemental chlorine and bromine with a hydroxyaryl sulfone in a carboxyic acid solvent medium, said acid having from 1 to 6 carbon atoms. The brominated or chlorinated product is produced in excellent yields and is easily separated by precipitation and filtration, since it has been found that the carboxylic acid not only provides a suitable medium for halogenation but it is also a selective solvent from which the halogenated product precipitates.

Illustrative sulfones which can be halogenated in accordance with the process of the present invention include any aryl sulfone containing at least one aromatic nucleus having at least one nuclearly substituted hydroxyl group, and at least one carbon atom on the ring capable of being brominated or chlorinated. The sulfones may be diaryl sulfones or alkyl aryl sulfones, provided the aryl has a hydroxyl substituent on the ring. Examples of sulfones capable of being brominated or chlorinated include 4,4′-dihydroxydiphenyl sulfone; 2,4′-dihydroxydiphenyl sulfone; 2,2′-dihydroxy 5,5′-dimethyldiphenyl sulfone; 2,2′-dihydroxy 5,5′-diethyl diphenyl sulfone; dicresyl sulfone; dihydroxydinaphthyl sulfone; hydroxyphenyl methyl sulfone; hydroxyphenyl ethyl sulfone and the like. Also suitable are, for instance, any of the following containing a hydroxyl group: tolyl phenyl sulfones, phenyl naphthyl sulfone, dinaphthyl sulfone, phenyl biphenyl sulfone, methoxy phenyl sulfone, phenyl (ethyl) phenyl sulfone, di-(ethyl) phenyl sulfone, xylyl methoxy tolyl sulfone, phenyl cymene sulfone, phenoxyethyl phenyl sulfone, phenoxyphenyl phenyl sulfone, diacenaphthyl sulfone, dianthryl sulfone, tolylanthryl sulfone and other similar compounds. Preferably, the sulfone is a diphenyl sulfone containing no more than 2 hydroxy groups and no other ring substituents.

In practicing the process of the present invention, the sulfone is first dissolved in the carboxylic acid. Preferably, acetic acid will be employed and especially glacial acetic acid. Also suitable are formic, propionic, butyric, valeric and caproic acids. Usually, about 500 mls. of acid should be combined with each 100 grams of hydroyaryl sulfone reactant. The mixture is then warmed to a temperature of from about 50° C. to 100° C. to completely dissolve the sulfone. Once a homogeneous solution is obtained, gaseous or liquid chlorine or bromine, as the case may be, is introduced into the reaction vessel. During halogenation the reaction mixture is preferably maintained at a temperature of from about 75° C. to about 110° C. or at reflux temperature, and conditions of agitation are maintained. Care should be taken not to exceed the boiling point of the carboxylic acid solvent in those cases where the reaction is carried at atmospheric pressure.

Generally a slight excess of chlorine or bromine over the stoichiometric amount will be introduced so as to maximize the yield obtainable. The elemental halogen is advantageously metered into the stirred reaction mixture over a period of from about 2 to 7 hours. The halogenation may be carried out at either atmospheric or superatmospheric pressures. These conditions are variable as long as a homogeneous solution of sulfone reactant in the acid is maintained.

As the chlorination or bromination proceeds to completion, the halogenated hydroxyaryl sulfone begins to precipitate from the carboxylic acid solvent medium. At the conclusion of the reaction, the solution is filtered while still warm in order to keep unreacted sulfone in solution. The precipitate thusly recovered is dried and may be further purified by conventional recrystallization techniques. Yields in the area of 40% to 85% and higher are easily obtainable.

The invention is further illustrated by the following examples which are not to be considered as limitative of its scope. All temperatures recited are in degrees C.

EXAMPLE 1

500 g. of dihydroxydiphenyl sulfone (a mixture of 25% 2,4′- and 75% 4,4′-isomers) was added to 3 liters of glacial acetic acid and the mixture heated to 85° with agitation whereupon all the sulfone dissolved. The mixture was maintained at a temperature of about 85° to reflux temperature for a period of about 6 hours during which time 1400 g. of gaseous chlorine was gradually introduced into the stirred solution. After about 4 hours a white precipitate began to form. At the conclusion of the reaction the reaction mass was filtered while warm whereupon 320 g. of a white solid melting at 279°–285° were obtained which was identified as the 3,3′,5,5′-chloroderivative of dihydroxydiphenyl sulfone. Elemental analysis for $C_{12}H_6Cl_4O_4S$ agreed with theory.

EXAMPLE 2

Example 1 was repeated except that aqueous ethanol was used as the solvent (approx. 65% $C_2H_5OH$ and 35% $H_2O$). As chlorination proceeded, a dark brown product was obtained indicating decomposition or oxidation. Complex products were obtained which could not be identified. This example illustrates the significance of the use of the carboxylic acids as the solvent media in the reaction to produce halogenated hydroxyaryl sulfones.

EXAMPLE 3

250 g. of dihydroxydiphenyl sulfone (a mixture of 25% 2,4'- and 75% 4,4'-isomers) was added to 3 liters of glacial acetic acid and the mixture was heated to about 85° whereupon all the sulfone dissolved. The reaction mixture was maintained at a temperature of about 85° to reflux and 700 g. of liquid bromine was added dropwise to the stirred reaction mixture over a period of about 75 minutes. The precipitated reaction product was recovered by filtration and washed with methanol to give a white product. Elemental analysis agreed with theoretical for $C_{12}H_6Br_4O_4S$.

What is claimed is:

1. A process for producing a halogenated hydroxyaryl sulfone which comprises reacting a member of the group consisting of elemental chlorine and bromine with a solution of a hydroxyaryl sulfone in a $C_1$ to $C_6$ carboxylic acid solvent medium and separating therefrom said halogenated hdyroxyaryl sulfone in the form of a precipitate which is insoluble in said acid solvent medium.

2. A process according to claim 1 wherein the sulfone is a dihydroxy diaryl sulfone.

3. A process according to claim 2 wherein the reaction is carried out at a temperature in the range between about 75° C. and about 110° C.

4. A process according to claim 3 wherein the solvent is acetic acid.

5. A process according to claim 4 wherein said dihydroxy diaryl sulfone is dihydroxy diphenyl sulfone.

References Cited

UNITED STATES PATENTS 3,143,575     8/1964     Bryner et al. _____ 260—607 A X

OTHER REFERENCES

Blatt: "Organic Synthesis," v. II, pp. 100–101 (1955).

Houben-Weyl: "Methoden der Organischen Chemie," v. 5, part 3, p. 681 (1962).

LEWIS GOTTS, Primary Examiner

D. R. PHILLIPS, Assistant Examiner